(12) United States Patent
Yamashita et al.

(10) Patent No.: US 10,884,022 B2
(45) Date of Patent: Jan. 5, 2021

(54) SCANNER AND SCANNING PROBE MICROSCOPE

(71) Applicant: OSAKA UNIVERSITY, Osaka (JP)

(72) Inventors: Hayato Yamashita, Osaka (JP); Masayuki Abe, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 16/476,426

(22) PCT Filed: Dec. 7, 2017

(86) PCT No.: PCT/JP2017/044060
§ 371 (c)(1),
(2) Date: Jul. 8, 2019

(87) PCT Pub. No.: WO2018/131343
PCT Pub. Date: Jul. 19, 2018

(65) Prior Publication Data
US 2020/0049733 A1 Feb. 13, 2020

(30) Foreign Application Priority Data
Jan. 10, 2017 (JP) .................... 2017-002183

(51) Int. Cl.
*G01Q 10/02* (2010.01)
*G01Q 10/04* (2010.01)

(52) U.S. Cl.
CPC .......... *G01Q 10/02* (2013.01); *G01Q 10/04* (2013.01)

(58) Field of Classification Search
USPC ............................................. 850/2
See application file for complete search history.

(56) References Cited

U.S. PATENT DOCUMENTS 5,723,775 A * 3/1998 Watanabe ............ G01Q 10/045
73/105
7,168,301 B2 * 1/2007 Su .......................... G01Q 60/26
73/105
(Continued)

FOREIGN PATENT DOCUMENTS

JP  S60-098691 A  6/1985
JP  H05-206533 A  8/1993
(Continued)

OTHER PUBLICATIONS

Japanese Office Action, Japanese Patent Office, Application No. 2018-561857, dated Jun. 2, 2020, with English translation.
(Continued)

*Primary Examiner* — Phillip A Johnston
(74) *Attorney, Agent, or Firm* — Greenblum & Bernstein, P.L.C.

(57) ABSTRACT

The present invention provides a scanner capable of achieving both a wide range of measurements and a high-speed and high-precision measurement.

A scanner comprising: an outer frame; a first inner frame disposed inside the outer frame; a wide range Y actuator for moving the first inner frame relative to the outer frame in the Y direction; a second inner frame disposed inside the first inner frame; a wide range X actuator for moving the second inner frame relative to the first inner frame in the X direction orthogonal to the Y direction; a third inner frame disposed inside the second inner frame; a narrow range Y actuator for moving the third inner frame relative to the second inner frame in the Y direction; a movable foundation disposed inside the third inner frame; and a narrow range X actuator for moving the movable foundation relative to the third inner frame in the X direction.

11 Claims, 12 Drawing Sheets

(56) References Cited

U.S. PATENT DOCUMENTS

| | | | |
|---|---|---|---|
| 7,958,565 B2 | 6/2011 | Ando et al. | |
| 8,065,908 B2 | 11/2011 | Uchihashi et al. | |
| 8,217,367 B2 * | 7/2012 | Fukuma | G01Q 10/04 250/442.11 |
| 9,520,813 B2 * | 12/2016 | Yamamoto | H01L 41/042 |
| 10,048,849 B2 * | 8/2018 | Jin | G06F 3/04847 |
| 2007/0158559 A1 | 7/2007 | Kusaka et al. | |
| 2009/0230320 A1 | 9/2009 | Kusaka et al. | |
| 2012/0030845 A1 | 2/2012 | Fukuma et al. | |
| 2013/0212749 A1 * | 8/2013 | Watanabe | G01Q 10/06 850/4 |

FOREIGN PATENT DOCUMENTS

| | | |
|---|---|---|
| JP | 7-128467 | 5/1995 |
| JP | 2002-82036 | 3/2002 |
| JP | 2003-247929 | 9/2003 |
| JP | 2005-164278 | 6/2005 |
| JP | 2005-190228 | 7/2005 |
| JP | 2007-171022 | 7/2007 |
| JP | 2007-218677 | 8/2007 |
| JP | 2009-156780 | 7/2009 |
| JP | 2010-190657 | 9/2010 |
| WO | 2006/129561 | 12/2006 |
| WO | 2010/087114 | 8/2010 |
| WO | 2012/035826 | 3/2012 |

OTHER PUBLICATIONS

T. Ando et al., "High-speed Atomic Force Microscopy for Capturing Dynamic Behavior of Protein Molecules at Work," e-J. Surf. Sci. Nanotech. vol. 3 (2005), Dec. 7, 2005, pp. 384-392.

International Search Report in PCT/JP2017/044060, dated Feb. 20, 2018 (with English Translation).

International Preliminary Report on Patentability in PCT/JP2017/044060, dated Jul. 10, 2019 (with English Translation).

* cited by examiner

US 10,884,022 B2

SCANNER AND SCANNING PROBE MICROSCOPE

TECHNICAL FIELD

The present invention relates to a scanning probe microscope for displacing a sample stage relative to a probe for scanning, and more particularly, to a structure of a scanner for performing the scanning.

BACKGROUND ART

A scanning probe microscope (SPM) is a scanning microscope for mechanically scanning a mechanical probe to obtain information on sample surfaces, and is a generic name for a scanning tunneling microscope (STM), an atomic force microscope (AFM), a scanning magnetic force microscope (MFM), a scanning capacitance microscope (SCaM), a scanning near-field light microscope (SNOM), a scanning thermal microscope (SThM), and the like. In principle, a scanning probe microscope has, as a principle common element, a sample stage, a probe, a scanner for displacing the sample stage or the probe for scanning, and a detector for detecting a change in a physical quantity occurring in the probe. In the scanning probe microscope, the probe and the sample are raster-scanned relatively in the X and Y directions to obtain surface information of a desired sample region through the probe, and the surface information can be mapped and displayed on a monitor. In this specification, the height direction of the sample is defined as the Z direction, and two orthogonal directions in a plane orthogonal to the Z direction are defined as the X direction and the Y direction.

A typical scanning probe microscope is an atomic force microscope. In an atomic force microscope, a cantilever chip (a member to which a very small probe is attached to the tip end of a cantilever) is used as a probe.

FIG. 1 is a diagram showing a configuration example of a main part of an atomic force microscope of a type in which a sample stage side is displaced for scanning. As shown in FIG. 1, in the sample stage displacement type apparatus, a scanner 200 for scanning a stage 122 on which a sample is arranged is provided on a microscope chassis 100. The scanner 200 includes a Z scanner that can be displaced in the Z direction (the vertical direction in the figure) in response to a control signal from a controller 102, and an X-Y scanner that can be displaced in the X-Y direction (two orthogonal directions along a plane perpendicular to the paper plane in the figure). The cantilever chip 110 has a cantilever 112 and a probe 114, and a base portion thereof is fixed to the microscope chassis 100 via an excitation piezoelectric body 115 or the like.

When the scanner is controlled by the controller 102 and the sample is displaced, a change occurs in the cantilever 112, the change is detected by an optical sensor unit 116, and from the data of each measurement point, the state of undulation of the sample surface is imaged by a computer 104 and displayed on a monitor 106. The structure of each part of the atomic force microscope and the feedback control are described in detail in, for example, Patent Documents 1 and 2.

FIG. 16 shows an example of the structure of a scanner 300 conventionally used. The scanner 300 has a structure in which an inner frame 304 is supported on the inner side of an outer frame 310 via plate springs 302 that can be deflected in the Y direction, and a base portion 307 is supported on the inner side of the inner frame 304 via plate springs 305 that can be deflected in the X direction. Between the inner side surface of the outer frame 310 and the outer side surface of the inner frame 304, there is provided a Y actuator 303 that expands and contracts in the Y direction in accordance with an applied voltage, and the members supported by the inner frame 304 and the inner frame 304 move relative to the outer frame 310 in the Y direction in accordance with the expansion and contraction of the Y actuator 303. An X actuator 306 that expands and contracts in the X direction in accordance with an applied voltage is provided between the inner side surface of the inner frame 304 and the outer side surface of the base portion 307, and members supported by the base portion 307 and the base portion 307 move relatively in the X direction with respect to the inner frame 304 and the outer frame 310 in accordance with expansion and contraction of the X actuator 306. A stage 309 is provided on the base portion 307 via a Z actuator 308 that expands and contracts in the Z direction in accordance with an applied voltage. In accordance with the expansion and contraction of the Z actuator 308, the stage 309 and the sample disposed on the stage 309 move relatively in the Z direction with respect to the base portion 307 and the outer frame 310. In the scanner 300 having such a structure, the Y actuator 303 and the X actuator 306 are driven by the control signal to displace the stage 309 in the X-Y direction, and the Z actuator 308 is driven by the control signal to displace the stage 309 in the Z direction.

In order to increase the time resolution of the scanning probe microscope (in other words, to shorten the time required to scan one frame), it is important to increase the resonance frequency (natural frequency) of the scanner itself, which is the rate-limiting factor of the response of the scanner. In this respect, the XYZ scanner 300 having the above-described structure is used in a high-speed scanning probe microscope (for example, see Non-Patent Document 1) because the number of resonance peaks can be reduced by a relatively simple structure and the resonance frequency can be relatively increased by increasing the strength (rigidity) of the scanner.

The objects to be measured by the scanning probe microscope are various, and besides the surfaces of materials such as metals, semiconductors, ceramics and the like which have been measured from the past, cells, protein molecules and the like are also objects to be measured in recent years in the field of medical and biological research. Conventional measurements of protein molecules were obtained by imaging the protein molecules which are taken out of the cells and fixed on a support substrate, but not by imaging molecules actually functioning in the cells. Assuming imaging of molecules that are actually functioning in a cell, it is necessary to be compatible with imaging of a micrometer scale entire cell and imaging of nanometer scale protein molecules in the region in which the protein molecules are present in the cell.

In the conventional scanner 300 described above, high-speed scanning is realized in a scanning range on a nanometer scale, but when the scanning range is to be expanded, it is necessary to make the Y actuator 303 and the X actuator 306 have a larger expansion coefficient (also referred to as an expansion/contraction amount per unit voltage, or a piezoelectric constant). However, when the expansion coefficients of the Y actuator 303 and the X actuator 306 are increased, there is a problem that the response speed and the positional accuracy are lowered, and it is difficult to achieve both the measurement in a wide range and the measurement at high speed and high accuracy.

The problem of compatibility between wide-range measurement and high-speed and high-precision measurement as described above is a problem commonly existing not only in an atomic force microscope but also in a scanning probe microscope of a type in which a stage is displaced by a scanner.

PRIOR ART REFERENCE

Patent Document

Patent Document 1: WO 2010/087114
Patent Document 2: WO 2006/129561 A1
[Non-patent Document 1] T. Ando et al., e-J. Surf. Sci. Nanotech. 3, 384 (2005)

SUMMARY OF THE INVENTION

Problems to be Solved by the Invention

It is an object of the present invention to solve the above-mentioned problems and provide a scanner capable of achieving both a wide range of measurements and a high-speed and high-precision measurement, and a scanning probe microscope equipped with such a scanner.

Means for Solving the Problems

In order to solve the above problems, a scanner according to an embodiment of the present invention comprises an outer frame; a first inner frame disposed inside the outer frame; a wide range Y actuator for moving the first inner frame relative to the outer frame in the Y direction; a second inner frame disposed inside the first inner frame; a wide range X actuator for moving the second inner frame relative to the first inner frame in the X direction orthogonal to the Y direction; a third inner frame disposed inside the second inner frame; a narrow range Y actuator for moving the third inner frame relative to the second inner frame in the Y direction; a movable base disposed inside the third inner frame; and a narrow range X actuator for moving the movable base relative to the third inner frame in the X direction. By doing so, it is possible to achieve both wide-range measurement and high-speed and high-precision measurement.

In the present invention, the scanner may further comprise a stage supported by the movable base.

In the present invention, the range in which the stage can be moved by the wide range X actuator may be wider than the range in which the stage can be moved by the narrow range X actuator, and the range in which the stage can be moved by the wide range Y actuator may be wider than the range in which the stage can be moved by the narrow range Y actuator.

In the present invention, the stage may be supported on a movable base via a Z actuator that moves the stage relatively in a Z direction orthogonal to the X direction and the Y direction. In addition, a counter balance having a weight substantially equal to the total weight of the Z actuator and the stage may be attached to the surface of the movable base opposite to the surface on which the stage is supported via the Z actuator.

In the present invention, the first inner frame may be connected to the outer frame via a plurality of plate springs whose plate surfaces are substantially orthogonal to the Y direction, the second inner frame may be connected to the first inner frame via a plurality of plate springs whose plate surfaces are substantially orthogonal to the X direction, the third inner frame may be connected to the second inner frame via a plurality of plate springs whose plate surfaces are substantially orthogonal to the Y direction, and the movable base may be connected to the third inner frame via a plurality of plate springs whose plate surfaces are substantially orthogonal to the X direction.

In the present invention, a movable base counterpart having a weight substantially equal to that of the movable base is further provided inside the third inner frame, and the narrow range X actuator is a piezoelectric element which can expand and contract in the X direction in response to a control signal, and is preferably disposed between the movable base and the movable base counterpart.

In the present invention, the wide range Y actuator may be a piezoelectric element which can expand and contract in the Y direction in response to the control signal, and may be disposed between the inner side surface of the outer frame and outer side surface of the first inner frame. The wide range X actuator may be a piezoelectric element which can expand and contract in the X direction in response to the control signal, and may be disposed between the inner side surface of the outer frame or the inner side surface of the first inner frame and the outer side surface of the second inner frame. The narrow range Y actuator may be a piezoelectric element which can expand and contract in the Y direction in response to the control signal, and may be disposed between the inner side surface of the second inner frame and the outer side surface of the third inner frame.

In the present invention, the probe may be supported by a movable base. In this manner, the scanner can be applied to a scanning probe microscope of a type in which the probe side is displaced for scanning.

In the present invention, the scanner may further comprise a wide range Z actuator for moving the outer frame relative to a support base in the Z direction. Here, it is preferable that the movable range by the wide range Z actuator is wider than the movable range by the Z actuator described above.

A scanner according to another embodiment of the present invention comprises a supported body; a movable base supporting the supported body; a narrow range Z actuator disposed between the movable base and the supported body for moving the supported body relative to the movable base in the Z direction; an XY scanner for supporting the movable base and relatively moving the movable base in the X and Y directions; and a wide range Z actuator disposed between the XY scanner and a support base for moving the XY scanner relative to the support base in the Z direction.

In the present invention, the movable range by the wide range Z actuator may be wider than the movable range by the narrow range Z actuator.

The scanner may further comprise a flat plate-like support plate, and the wide range Z actuator may be attached to the first side of the support plate. The scanner may further include a counter wide range actuator provided at a position facing the wide range Z actuator on the second surface, which is the surface opposed to the first surface, and having the same characteristics as the wide range Z actuator, and a counter balance supported by the counter wide range Z actuator and having a weight substantially equal to the total weight of the support, the movable base, the narrow range Z actuator, and the XY scanner.

In order to solve the above-mentioned problems, a scanning probe microscope according to the present invention is characterized by including any one of the above-mentioned scanners.

BRIEF DESCRIPTION OF THE DRAWINGS

FIG. 11 (b) is a diagram showing the frequency characteristic of the Z scanning by the narrow range Z actuator.

DESCRIPTION OF EMBODIMENTS

First Embodiment

Figure 1:
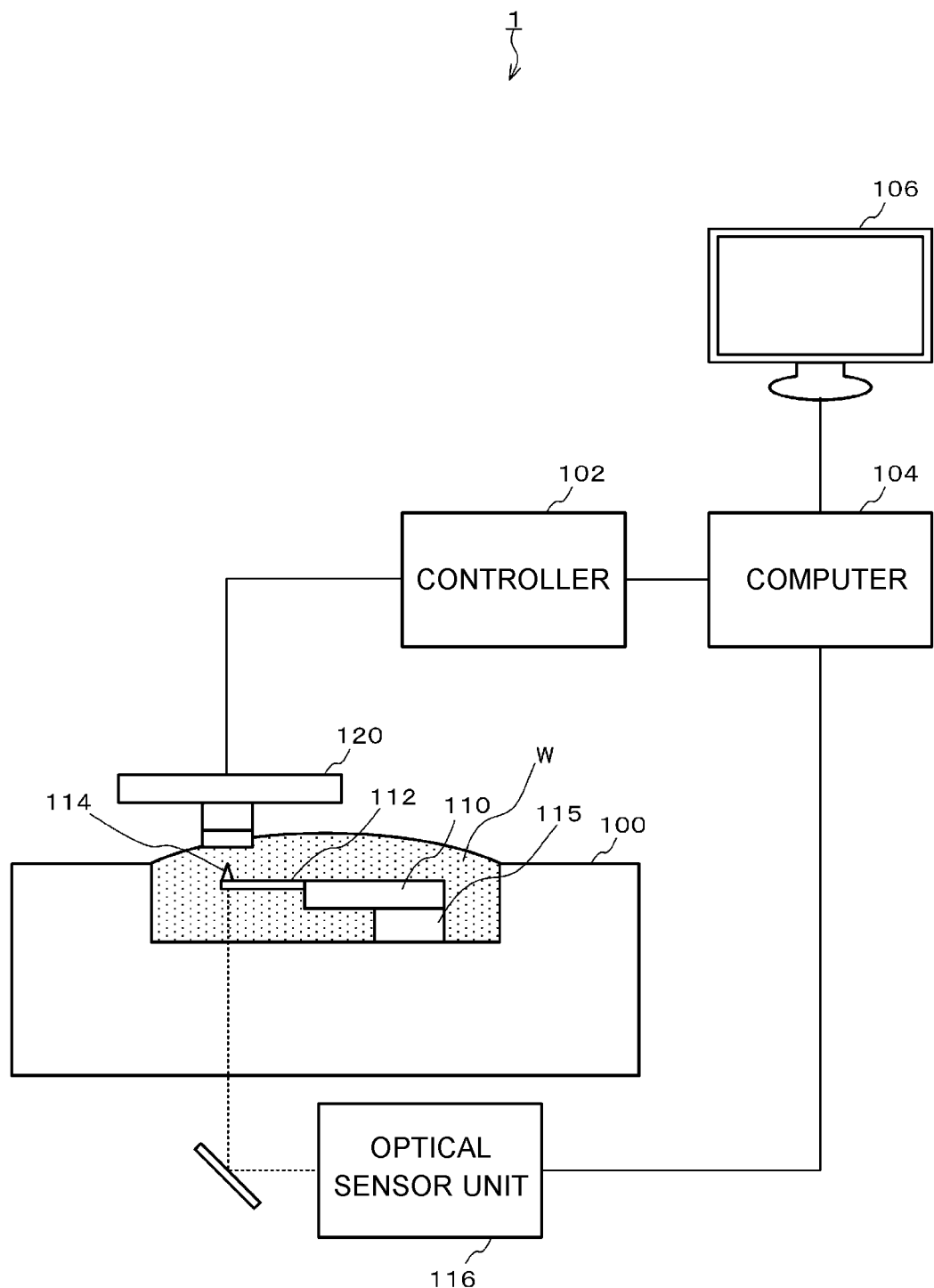
FIG. 1 is a diagram schematically showing the configuration of an atomic force microscope according to the first embodiment.

Hereinafter, the configuration of the scanning probe microscope according to the first embodiment of the present invention will be described with reference to the drawings. In this specification, in each drawing showing the configuration of the scanning probe microscope, the shape, dimensions, and the like of the constituent elements may be exaggerated or deformed in order to explain the main features thereof, and the shape drawn in the drawing is not necessarily a faithful drawing of the shape of an actual object. FIG. 1 is a drawing schematically showing a configuration of a scanning probe microscope according to a first embodiment of the present invention, and shows a configuration example of an atomic force microscope 1 as a specific example of the scanning probe microscope.

Atomic force microscope 1 is a microscope that uses a cantilever chip 110 as a probe (a member to which a probe 114, which is a very microscopic projection at the tip of cantilever 112, is applied) to image the undulation of the sample surface through a change in cantilever 112 due to the interaction between probe 114 and the sample surface (such as displacement of the tip of the cantilever by an atomic force in a DC mode (contact mode or non-contact mode) or a change in cantilever vibration in an AC mode (sometimes referred to as a tapping mode).

As shown in FIG. 1, the atomic force microscope 1 includes a microscope chassis 100, a cantilever chip 110, an optical sensor unit 116, a stage 122, a scanner 200, a controller 102, a computer 104, and a monitor 106.

As described above, the cantilever chip 110 is a member in which an extremely minute probe 114 is provided on the tip end of the cantilever 112. The cantilever chip 110 is fixed to the microscope chassis 100 via an excitation piezoelectric body 115 for vibrating the cantilever 112 in order to perform measurement in the AC mode.

The scanner 200 supports the stage 122, and moves the stage 122 in the X direction, the Y direction, and the Z direction relative to a probe mounted on the microscope chassis 100 serving as a support base. The scanner 200 is detachably attached to the microscope chassis 100. In a state in which the scanner 200 is attached to the microscope chassis 100, the stage 122 is disposed at a position facing the probe 114 at the tip end of the cantilever 112. A sample (or a sample table holding the sample) to be measured by the atomic force microscope 1 is fixed to the stage 122.

Figure 2:
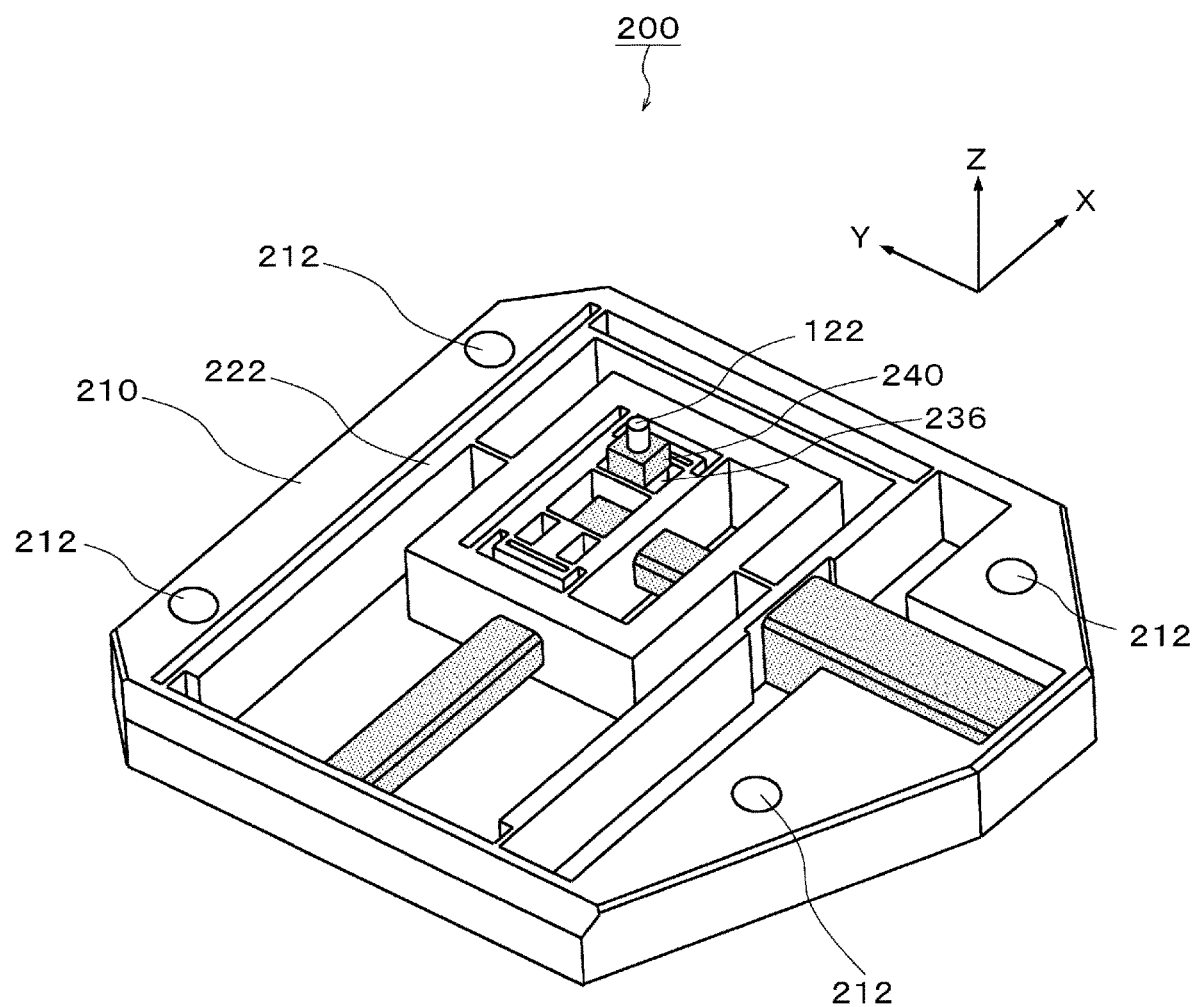
FIG. 2 is a perspective view showing the configuration of the scanner according to the first embodiment.
Figure 3:
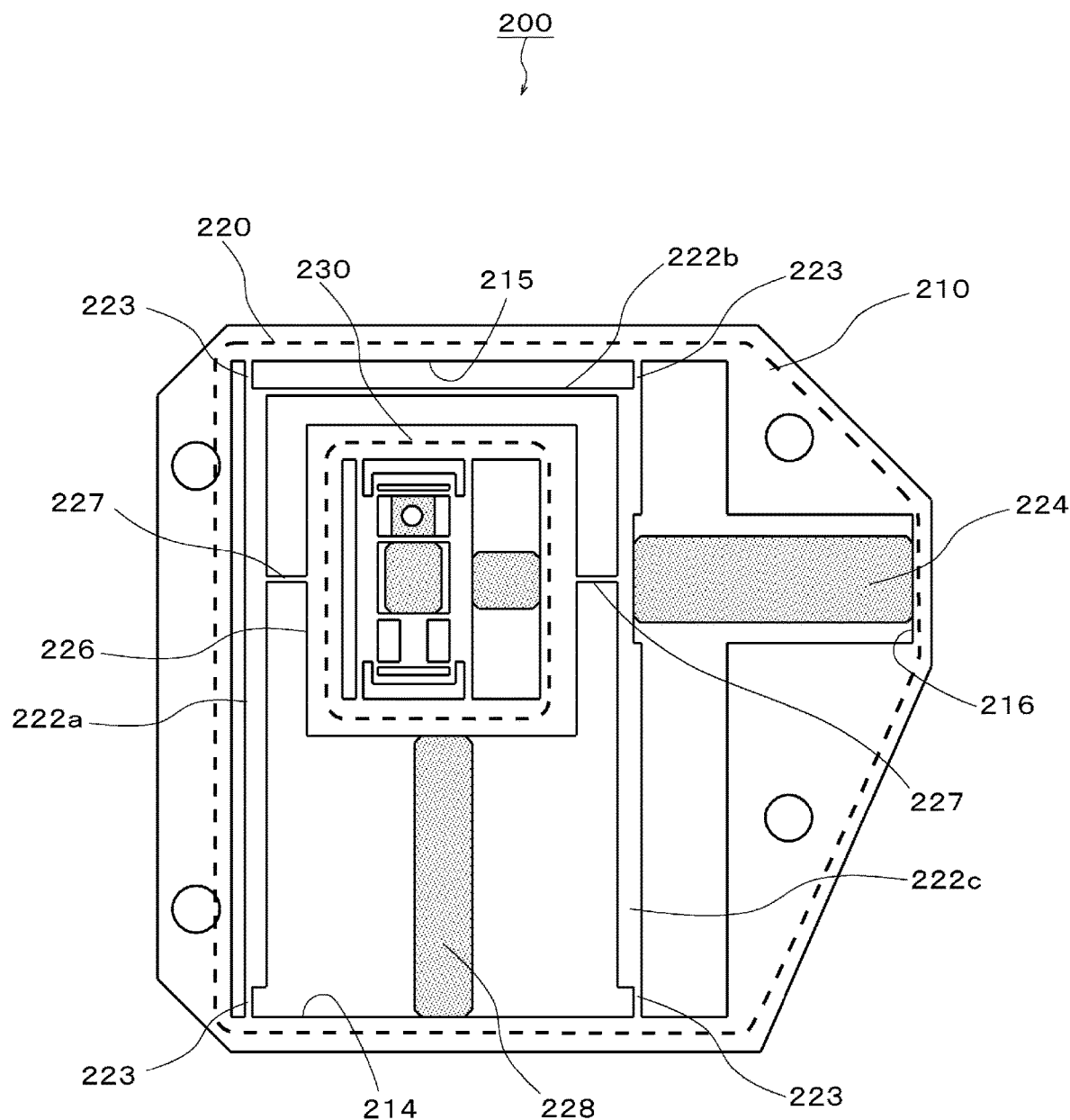
FIG. 3 is a plan view showing the configuration of the scanner according to the first embodiment.
Figure 4:
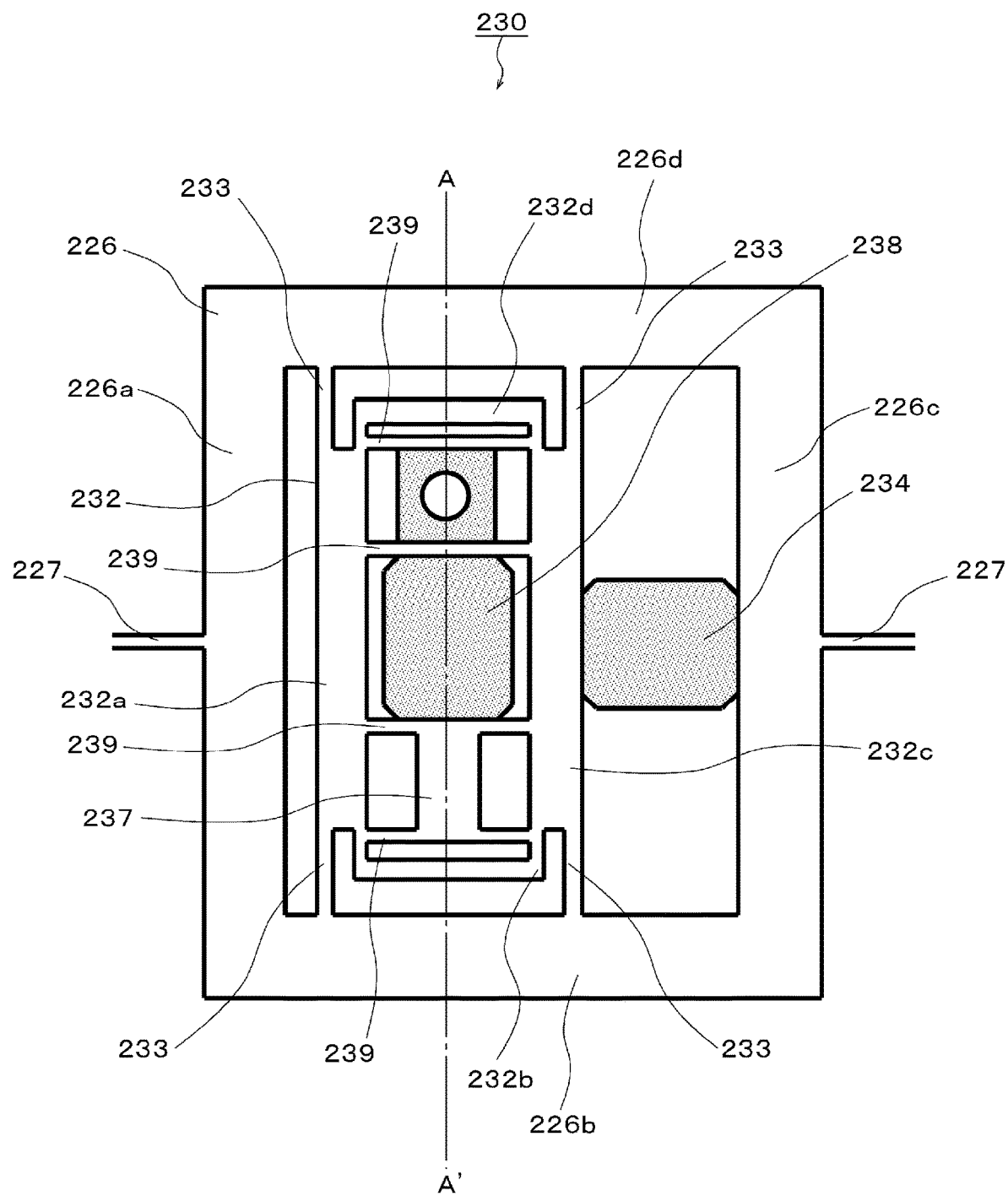
FIG. 4 is a partially enlarged view showing the configuration of the scanner according to the first embodiment.
Figure 5:
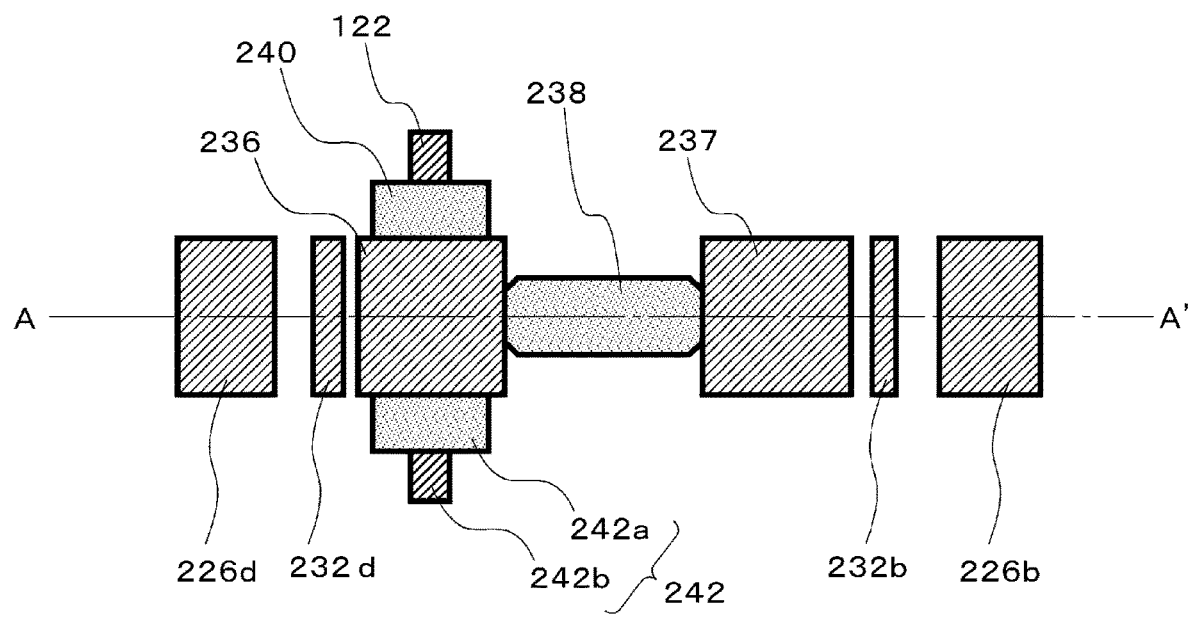
FIG. 5 is a cross-sectional view of the scanners according to the first embodiment taken along the A-A' in FIG. 4.

FIGS. 2-5 show the structure of scanner 200 along with stage 122. FIG. 2 is a perspective view showing the configuration of a scanner stage unit 120. FIG. 3 is a plan view showing the configuration of the scanner stage unit 120. FIG. 4 is a partially enlarged view showing the configuration of the scanner 200. FIG. 5 is a cross-sectional view of the scanner 200 taken along the A-A' of FIG. 4.

The scanner 200 has a structure in which a narrow range XY scanner 230 whose scanning range is narrower than that of a wide range XY scanner 220 is supported in a nested state in the wide range XY scanner 220, and the wide range XY scanner 220 and the narrow range XY scanner 230 are accommodated in an outer frame 210. The stage 122 is supported by the narrow range XY scanner 230 via the Z actuator 240.

The outer frame 210 is a frame body having high rigidity, and is formed of metal such as Invar, for example. The outer dimensions of the outer frame 210 are each about 50 mm in length and width (X direction and Y direction), for example, about 5 mm in thickness (Z direction). The outer frame 210 is provided with a guide hole 212 for alignment with the microscope chassis 100. By screwing through the guide hole 212 and securing it to the microscope chassis 100, the scanner 200 can be attached to the correct position of the microscope chassis 100. The outer frame 210 has an opening for accommodating the scanner 200 inside while having a thickness sufficient to maintain strength. As shown in FIG. 3, the outer frame 210 has inner side surfaces 214 and 215 parallel to the Y-Z plane and an inner side surface 216 parallel to the X-Z plane.

As shown in FIG. 3, the wide range XY scanner 220 includes a first inner frame 222, a wide range Y actuator 224, a second inner frame 226, and a wide range X actuator 228.

The first inner frame 222 is a U-shaped frame body, and includes a side wall portion 222a, a connection portion 222b, and a side wall portion 222c. The side wall portion 222a and the side wall portion 222c are flat plate portions parallel to the X-Z plane. The connection portion 222b is a flat plate portion parallel to the Y-Z plane, and connects the side wall portion 222a and the side wall portion 222c. The first inner frame 222 is connected to the inner side surfaces 214 and 215 parallel to the Y-Z plane of the outer frame 210 at both ends of the side wall portion 222a and the side wall portion 222c in the Y direction via four plate springs 223. The plate spring 223 is provided so that the plate surface is substantially parallel to the X-Z plane (in other words, the plate surface is substantially orthogonal to the Y direction), and when the plate spring 223 is bent, the first inner frame 222 can move in the Y direction with respect to the outer frame 210, but the movement in the X direction and the Z direction is restricted.

The outer side surface of the side wall portion 222c of the first inner frame 222 is parallel to the X-Z plane. The outer side surface of the side wall portion 222c and the inner side surface 216 of the outer frame 210 parallel to the X-Z plane are disposed so as to face each other, and the wide range Y actuator 224 is disposed therebetween. The wide range Y actuator 224 is formed of a piezoelectric element such as a piezoelectric element, for example. The wide range Y actuator 224 has a free length, i.e., a length in a natural state in which a control signal is not applied, substantially equal to the gap between the outer side surface of the side wall portion 222c and the inner side surface 216 of the outer frame 210. The wide range Y actuator 224 expands and contracts in response to a control signal from the controller 102, and relatively moves the first inner frame 222 in the Y direction with respect to the outer frame 210 while deflecting the plate springs 223 in the Y direction. The wide range Y-actuator 224 may have an expansion coefficient that causes a displacement in the Y direction on a micrometer scale (e.g., 10 micrometers) when a maximum voltage (e.g., 100 volts) is applied.

The second inner frame 226 is a rectangular frame body, and includes a side wall portion 226a, a side wall portion 226b, a side wall portion 226c, and a side wall portion 226d. The side wall portion 226a and the side wall portion 226c are flat plate portions parallel to the X-Z plane. The side wall portion 226b and the side wall portion 226d are flat plate portions parallel to the Y-Z plane, and connect the side wall portion 226a and the side wall portion 226c, respectively.

The side wall portion 226a is connected to an inner side surface of the side wall portion 222a in the vicinity of the center in the X direction, the inner side surface being parallel to the X-Z plane, via a plate spring 227. Similarly, the side wall portion 226c is connected to the inner side surface of the side wall portion 222c in the vicinity of the center in the X direction, which is parallel to the X-Z plane, via a plate spring 227. The plate springs 227 is provided so that the plate surface is parallel to the Y-Z plane (in other words, the plate surface is substantially orthogonal to the X direction), and the second inner frame 226 can move in the X direction with respect to the outer frame 210 and the first inner frame 222 by deflecting the plate spring 227, but the movement in the Y direction and the Z direction is restricted.

The outer side surface of the side wall portion 226d is parallel to the Y-Z plane, and is disposed so as to face the inner side surface 215 of the outer frame 210 parallel to the Y-Z plane. The wide range X actuator 228 is disposed between the outer side surface of the side wall portion 226b and the inner side surface 214 of the outer frame 210. The wide range X actuator 228 is formed of a piezoelectric element such as a piezoelectric element, for example. The wide range X actuator 228 has a free length substantially equal to the gap between the outer side surface of the side wall portion 226b and the inner side surface 214 of the outer frame 210. The wide range X actuator 228 expands and contracts in response to a control signal from the controller 102, and moves the second inner frame 226 relative to the outer frame 210 and the first inner frame 222 in the X direction while deflecting the plate spring 227 in the X direction. The wide range X-actuator 228 may have an expansion coefficient that causes a displacement in the X direction on a micrometer scale (e.g., 10 micrometers) when a maximum voltage (e.g., 100 volts) is applied.

With such a configuration, the wide range XY scanner 220 realizes a wide range XY scan in accordance with the control signal on the inner side of the outer frame 210.

As shown in FIG. 4, the narrow range XY scanner 230 includes a third inner frame 232, a narrow range Y actuator 234, a movable base 236, a movable base counterpart 237, and a narrow range X actuator 238.

The third inner frame 232 is a substantially rectangular frame body, and includes a side wall portion 232a, a connection portion 232b, a side wall portion 232c, and a connection portion 232d. The side wall portion 232a and the side wall portion 232c are flat plate portions parallel to the X-Z plane. The connection portion 232b and the connection portion 232d are flat plate portions parallel to the Y-Z plane, and connect the side wall portion 232a and the side wall portion 232c, respectively. The connection portion 232b and the connection portion 232d are connected to the inner side surface of the side wall portion 226b and the side wall portion 226d of the second inner frame 226 parallel to the Y-Z plane via the plate springs 233 at both ends in the Y direction. The plate spring 233 is provided so that the plate surface is substantially parallel to the X-Z plane (in other words, the plate surface is substantially orthogonal to the Y direction), and the third inner frame 232 can be moved in the Y direction with respect to the wide range XY scanner 220 by deflecting the plate spring 233, but the movement in the X direction and the Z direction is restricted.

The outer side surface of the side wall portion 232c is parallel to the X-Z plane. The outer side surface of the side wall portion 232c and the inner side surface of the side wall portion 226c parallel to the X-Z plane are disposed so as to face each other, and the narrow Y actuator 234 is disposed therebetween. The narrow Y actuator 234 is formed of a piezoelectric element such as a piezoelectric element, for example. The narrow Y actuator 234 has a free length, i.e., a length in a natural state in which a control signal is not applied, substantially equal to the gap between the outer side surface of the side wall portion 232c and the inner side surface of the side wall portion 226c. The narrow range Y actuator 234 expands and contracts in response to a control signal from the controller 102, and moves the third inner frame 232 relative to the wide range XY scanner 220 in the Y direction while deflecting the plate spring 233 in the Y direction. The narrow Y actuator 234 may have an expansion coefficient that produces a nanometer scale (e.g., 700 nanometers) displacement in the Y direction when a maximum voltage (e.g., 100 volts) is applied.

The movable base 236 is a substantially rectangular parallelepiped block. Both ends of the movable base 236 in the X direction are connected to the inner side surfaces of the side wall portions 232a and 232c via plate springs 239. Here, the movable base 236 is connected to the vicinity of one end in the X direction of the side wall 232a and the side wall 232c. The plate spring 239 is provided so that the plate surface is parallel to the Y-Z plane (in other words, the plate surface is substantially orthogonal to the X direction), and the movable base 236 can move in the X direction with respect to the wide range XY scanner 220 by deflecting the plate spring 239, but the movement in the Y direction and the Z direction is restricted.

The stage 122 is disposed on a first surface of the movable base 236 parallel to the X-Y plane via a Z actuator 240. The Z actuator 240 is formed of, for example, a piezoelectric element such as a piezoelectric element, and expands and contracts in the Z direction in response to an applied control signal. A control signal corresponding to the measurement mode is applied to the Z actuator 240 by the controller 102.

For example, in the tapping mode, a signal for controlling the change of the vibration of the cantilever to be constant is applied, and the position in the Z direction is changed following the change of the distance between the sample surface and the cantilever in accordance with the XY scan.

As shown in FIG. 5, a counterbalance 242 having a weight substantially equal to the combined weight of the Z actuator 240 and the stage 122 is disposed on a second surface of the movable base 236 opposite to the first surface. The counter balance 242 balances the load weight driven by the narrow range X actuator 238 in the Z direction. The counter balance 242 includes a counter actuator 242a similar to the Z actuator 240 and a counter stage 242b similar to the stage 122. The same control signal as that applied to the Z actuator 240 is applied to the counter actuator 242a by the controller 102, and the counter actuator 242a expands and contracts in the same manner as the Z actuator 240 in response to the control signal. Such a structure and control can prevent the center of gravity of the load weight of the narrow range X actuator 238 from fluctuating in the Z direction as the Z actuator 240 expands and contracts. In this manner, the narrow X actuator 238 can achieve displacement in the X direction while maintaining balance in the Z direction. As a result, the resonance frequency of the structure including the movable base 236, the movable base counterpart 237, and the like arranged inside the third inner frame 232 is increased, which can contribute to realization of high-speed scanning. In order to simplify the configuration and control, the counter balance 242 may have a weight substantially equal to the combined weight of the Z actuator 240 and the stage 122, but from the standpoint of suppressing the movement of the center of gravity due to expansion and contraction of the Z actuator 240, the configuration including the counter actuator 242a described above is more preferable.

Returning to FIG. 4, the movable base counterpart 237 is a substantially rectangular parallelepiped block. Both ends of the movable base counterpart 237 in the X direction are connected to the inner side surfaces of the side wall portions 232a and 232c via plate springs 239. Here, the movable base counterpart 237 is connected to the vicinity of the other end in the X direction of the side wall portion 232a and the side wall portion 232c, that is, the end on the side to which the movable base 236 is not connected. The plate spring 239 is provided so that the plate surface is parallel to the Y-Z plane, and the movable base 236 can move in the X direction with respect to the wide range XY scanner 220 by deflecting the plate spring 239, but the movement in the Y direction and the Z direction is restricted.

The movable base counterpart 237 has a weight substantially equal to that of the movable base 236. A weight (not shown) having a weight substantially equal to the total weight of the Z actuator 240, the counter balance 242, and the stage 122 is mounted on the movable base counterpart 237.

A narrow range X actuator 238 is disposed between the movable base 236 and the movable base counterpart 237. The narrow range X actuator 238 is formed of a piezoelectric element such as a piezoelectric element, for example. The narrow X actuator 238 has a free length substantially equal to the gap between the movable base 236 and the movable base counterpart 237. The narrow range X actuator 238 expands and contracts in response to a control signal from the controller 102, and pushes the movable base 236 and the movable base counterpart 237 in opposite directions in the X direction while deflecting the plate spring 239 in the X direction. As described above, since the movable base 236 and the movable base counterpart 237 are of substantially equal weight and a weight of substantially equal weight to the total weight of the Z actuator 240, the counter balance 242, and the stage 122 supported by the movable base 236 is attached to the movable base counterpart 237, the narrow range X actuator 238 can be driven in the X direction in a balanced manner (with equal loads on both sides). As a result, the resonance frequency of the structure including the movable base 236, the movable base counterpart 237, and the like arranged inside the third inner frame 232 is increased, which can contribute to realization of high-speed scanning. The narrow-range X-actuator 238 may have an expansion coefficient that results in a nanometer-scale (e.g., 700 nanometers) displacement in the X-direction with respect to the movable base 236 when a maximum voltage (e.g., 100 volts) is applied.

With such a configuration, the narrow range XY scanner 230 realizes a narrow range XY scan in accordance with the control signal inside the wide range XY scanner 220. Although the scanning range of the narrow range XY scanner 230 is narrower than that of the wide range XY scanner 228, the narrow range XY scanner 230 has a resonance frequency higher than that of the wide range XY scanner 220 and can perform high-speed scanning because of the light weight and the simple structure of the mass to be driven during scanning. In addition, since the narrow range Y actuator 234 and the narrow range X actuator 238 of the narrow range XY scanner 230 have an expansion coefficient smaller than that of the wide range Y actuator 224 and the wide range X actuator 228 of the wide range XY scanner 220, scanning with high positional accuracy is possible although the scanning range is narrowed.

The outer frame 210, the first inner frame 222, the plate springs 223, the second inner frame 226, the plate springs 227, the third inner frame 232, the plate springs 233, the movable base 236, the movable base counterpart 237, and the plate springs 239 are integrally formed of metal such as invar, for example. A buffer material such as a urethane resin may be filled in the space inside the outer frame 210 where the wide range XY scanner 220 and the narrow range XY scanner 230 are not disposed in order to absorb shock.

Returning to FIG. 1, the optical sensor unit 116 detects the displacement of the cantilever 112 based on the interaction between the probe 114 at the tip of the cantilever 112 and the sample surface, and outputs a signal based on the displacement. The optical sensor unit 116 may comprise, for example, a sensor known as an optical lever type optical sensor. The optical lever type optical sensor irradiates the back surface of the cantilever 112 with a laser beam through an optical system such as a lens, a mirror, or the like as necessary, and receives the reflected light by a photodiode. The optical lever type optical sensor detects the displacement of the cantilever 112 as the movement of the laser light spot on the photodiode.

The scanner 200 is connected to the controller 102, and the optical sensor unit 116 for detecting the displacement of the cantilever 112 is connected to the computer 104. A monitor 106 is connected to the computer 104. The controller 102 includes, for example, a laser diode drive circuit, a preamplifier circuit, an oscillator circuit, a AC/DC converter circuit, a feedback circuit, a scan control circuit, an actuator drive circuit, and the like. The controller 102, the computer 104, and the monitor 106 perform control and driving of the atomic force microscope mechanism and signal processing, and finally display the unevenness information of the sample on the monitor 106, whereby the user can obtain knowledge on the surface information of the sample.

In actual measurement, first, in a state where the narrow range XY scanner 230 is fixed to a reference position of the narrow range scan, for example, a center position of the narrow range scan, a wide range scan is performed using the wide range XY scanner 220, and observation of a sample surface on a micrometer scale is performed. This wide range scan is relatively slow, e.g., on the order of 0.5 seconds per frame, but a wide range of samples can be captured in one image. Next, in the image obtained by the wide range scanning, a point of interest to be a target of the narrow range scanning is specified. Then, a voltage is applied to the wide range Y actuator 224 and the wide range X actuator 228 of the wide range XY scanner 220 so that the point of interest becomes the reference position of the narrow range scanning. That is, the wide range XY scanner 220 realizes the offset to the position where the narrow range scanning is performed. In this state, narrow range scanning is performed by the narrow range XY scanner 230. The narrow scan is relatively fast, e.g., 30 milliseconds per frame, and can visualize the dynamics of the point of interest.

In FIG. 1, an observation in a liquid is depicted, and a water droplet W is suspended from the vicinity of the sample of the scanner stage unit 120 to the vicinity of the cantilever chip 110, and both the sample and the cantilever chip 110 are located in the water. In this manner, the atomic force microscope 1 is capable of observation in a liquid, which is an indispensable requirement when observing a living biological sample. When the measurement is performed in the air, this water is unnecessary.

Second Embodiment

Problems related to the compatibility of a wide range of measurements with high speed and high precision measurements can occur not only in the X and Y directions in which scanning is performed, but also in the Z direction, which is the direction of the height of the sample. The scanning probe microscope according to the second embodiment of the present invention enables both wide range measurement in the Z direction and high-speed and high-precision measurement.

Figure 6:
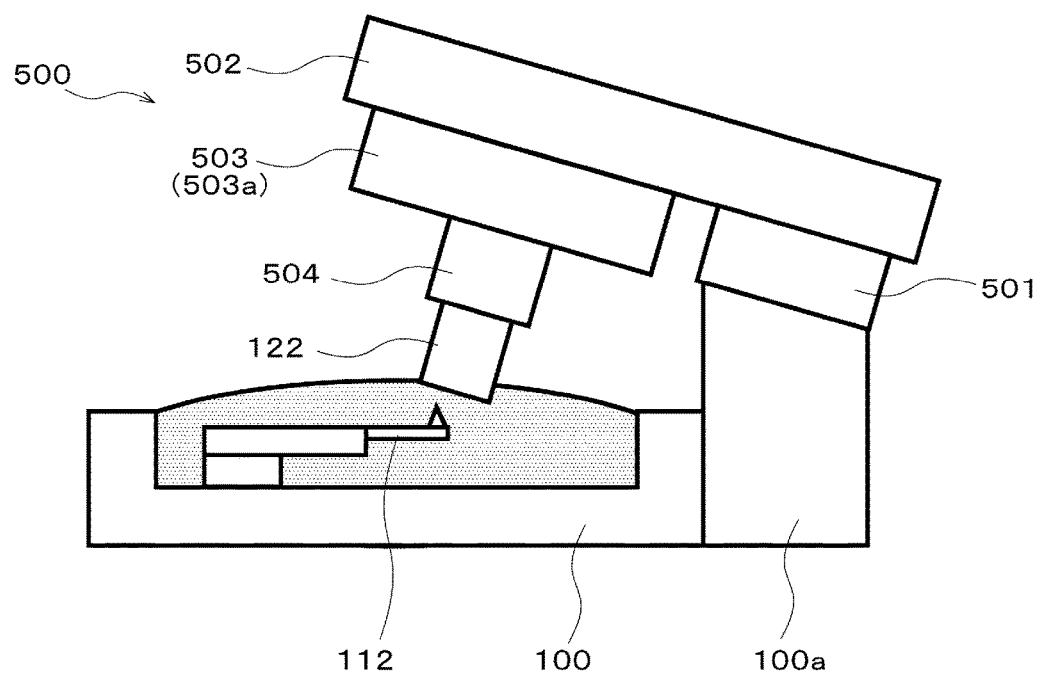
FIG. 6 is a diagram schematically showing the configuration of an atomic force microscope according to the second embodiment.

The schematic configuration of the scanning probe microscope according to the second embodiment is the same as that of the first embodiment except that a wide range Z actuator is provided in the Z direction. FIG. 6 is a diagram schematically and roughly showing a configuration of a scanning probe microscope (an atomic force microscope 1) according to the second embodiment of the present invention.

As shown in FIG. 6, similarly to the first embodiment, the cantilever 112 is supported by the microscope chassis 100. The microscope chassis 100 has a support post 100a, and a scanner is attached to the support post 100a. The scanner 500 of the present embodiment includes a wide range Z actuator 501, a support plate 502, an XY scanner 503, a movable base 503a, and a narrow range Z actuator 504. The scanner 500 is connected to a controller and driven similarly to the scanner 200 in the first embodiment.

One end of the wide range Z actuator 501 is fixed to the support post 100a. The other end of the wide range Z actuator 501 is secured to a support plate 502. The support plate 502 is a flat and high-rigidity plate material, and supports the XY scanner 503 as shown in FIG. 6. The XY scanner 503 moves the movable base 503a in the X direction and the Y direction. Note that the XY scanner 503 may have a configuration in which the wide range XY scanner and the narrow range XY scanner are nested similarly to the scanner 200 in the first embodiment, or may be a single XY scanner.

The movable base 503a supports the stage 122 via the narrow range Z actuator 504. The narrow range Z actuator 504 is disposed between the movable base 503a and the stage 122, and moves the stage 122 in the Z direction in a scanning range narrower than that of the wide range Z actuator 501.

The wide range Z actuator 501 is formed of, for example, a piezoelectric element such as a piezoelectric element. The wide range Z actuator 501 is disposed between the XY scanner and the microscope chassis 100 which is a support base, and moves the XY scanner 503 relative to the support base in the Z direction. The wide range Z actuator 501 supports, directly or indirectly, the XY scanner 503, the movable base 503a, the narrow range Z actuator 504, and the stage 122. With such a configuration, the wide range Z actuator 501 moves the stage 122 in the Z direction in a wider range than the narrow range Z actuator 504.

On the other hand, the narrow range Z actuator 504 moves the stage in the Z direction while being supported by the wide range Z actuator 501. Although the scanning range of the narrow-range Z actuator 504 is narrower than the scanning range by the wide-range Z actuator 501, the resonant frequency is higher than that of the wide-range Z actuator 501 because the weight to be driven is only the stage and it is lightweight, and therefore high-speed scanning is possible. In addition, since the narrow range Z actuator 504 has an expansion coefficient smaller than that of the wide range Z actuator 501, the resolution in the Z direction can be enhanced.

In actual measurement, first, in a state where the narrow range Z actuator 504 is fixed to a reference position, for example, a center position of the narrow range scan, the rough shape of the sample is observed at a substantially micrometer scale in a scanning range in a large Z direction by using the wide range Z actuator 501. In the scanning using the wide range Z actuator 501, the frequency characteristic or the like of the wide range Z actuator 501 restricts the band of the feedback control, and the speed becomes low (e.g., about 10 seconds/frame), but a sample having a large structure over a wide Z-direction range (e.g., cells) can be captured in one image.

Next, in the image obtained by the wide range scanning, a point of interest to be a target of the narrow range scanning is specified. The point of interest is a region (for example, a surface molecule of a cell membrane) in which the change in the Z direction (that is, the unevenness of the sample) is relatively small. Then, a voltage is applied to the wide range Z actuator 501 so that the point of interest becomes the reference position of the narrow range scanning. That is, the wide range Z actuator 501 realizes the offset to the position in the Z direction where the narrow range scanning is performed. Also in the XY direction, the scanning range is narrowed as compared with that in the wide range scanning while offsetting to a point of interest to be a target of the narrow range scanning. In this state, a narrow range scanning is performed using the XY scanner 503 and the narrow range Z actuator 504. The narrow range scanning is relatively fast, e.g., 30 milliseconds per frame, and the point of interest can be observed on a nanometer scale. In addition, since high-speed scanning is possible, the dynamic state of the target portion can be visualized.

EXAMPLES

In raster scanning in which scanning lines are sequentially moved in the Y direction while scanning is performed one-dimensionally in the X direction, scanning in the X direction becomes the highest speed, which is the rate-limiting of the entire scanning speed. That is, scanning in the X direction is a main factor that limits the frame rate and the temporal resolution of an image. It is the frequency below which the resonance peak appears in the frequency characteristic that the scanner can be accurately displaced according to the control signal. Therefore, in Example 1 described below, the scanner 200 having the structure shown in FIGS. 2 to 5 was manufactured and applied to an atomic force microscope, and the frequency characteristics (gain vs. frequency) of the X-direction scanning of the wide range XY scanner 220 and the narrow range XY scanner 230 were compared with the frequency characteristics of the X-direction scanning in the conventional scanner (Comparative Example 1).

Example 1

A scanner 200 having the structure shown in FIG. 2 was used. The expansion coefficient of the wide range X actuator 228 was 40 nm/V (i.e., 4 µm for the maximum scan range applied from 0 to 100 volts), and the expansion coefficient of the narrow range X actuator 238 was 7 nm/V (i.e., 700 nm for the maximum scan range applied from 0 to 100 volts). With respect to the scanning range in the Y direction, the maximum scanning range of the wide range Y actuator 224 was 8 µm, and the maximum scanning range of the narrow range Y actuator 234 was 1.5 µm.

Figure 7:
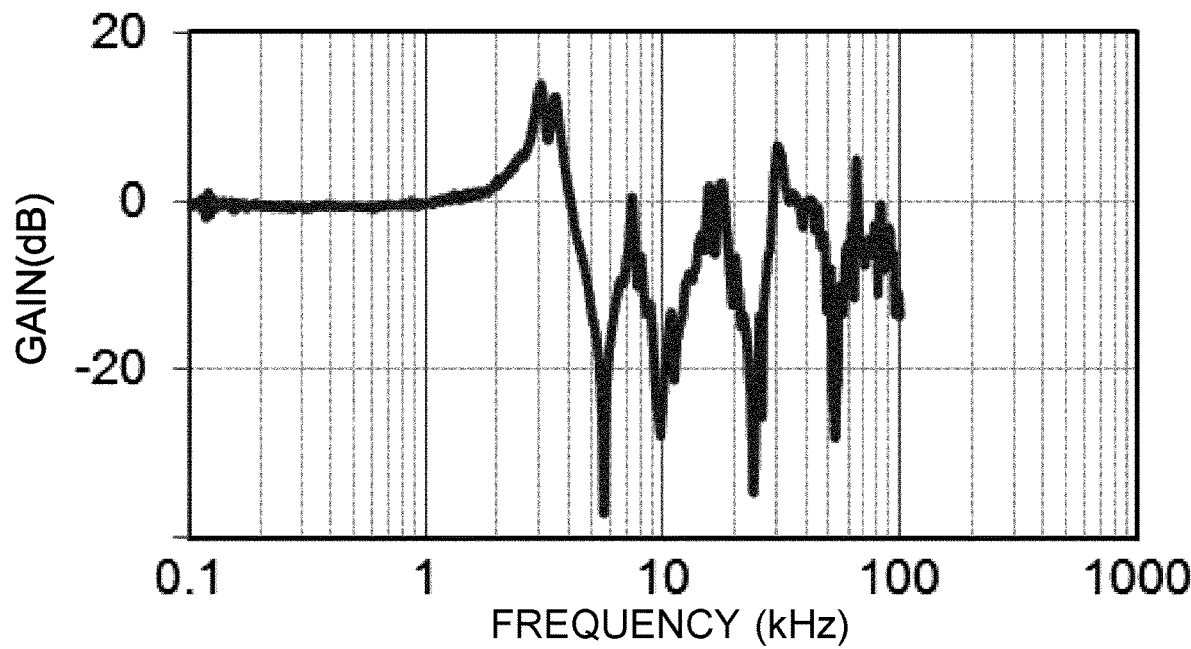
FIG. 7 is a graph showing the frequency characteristic of X scanning by the wide range XY scanner.

FIG. 7 shows the frequency characteristic of the X scanning by the wide range XY scanner 220. In the illustrated frequency characteristics, the horizontal axis represents the frequency (drive frequency) of the triangular wave for driving the X scanner, and the vertical axis represents the displacement (gain) at each drive frequency. The frequency characteristic of the X-scan by the wide range XY scanner 220 has the first resonance peak at about 3.5 kHz. With the first resonance peak at this frequency, an image of 100 pixels each in the vertical and horizontal directions for the maximum scanning range (4 µm in the X direction and 8 µm in the Y direction) by the wide range XY scanner 220 can be acquired at 0.6 sec/frame. It is possible to scan the same scanning range at the same speed as compared with the scanner 400 of the conventional type which will be described later as a comparative example.

Figure 8:
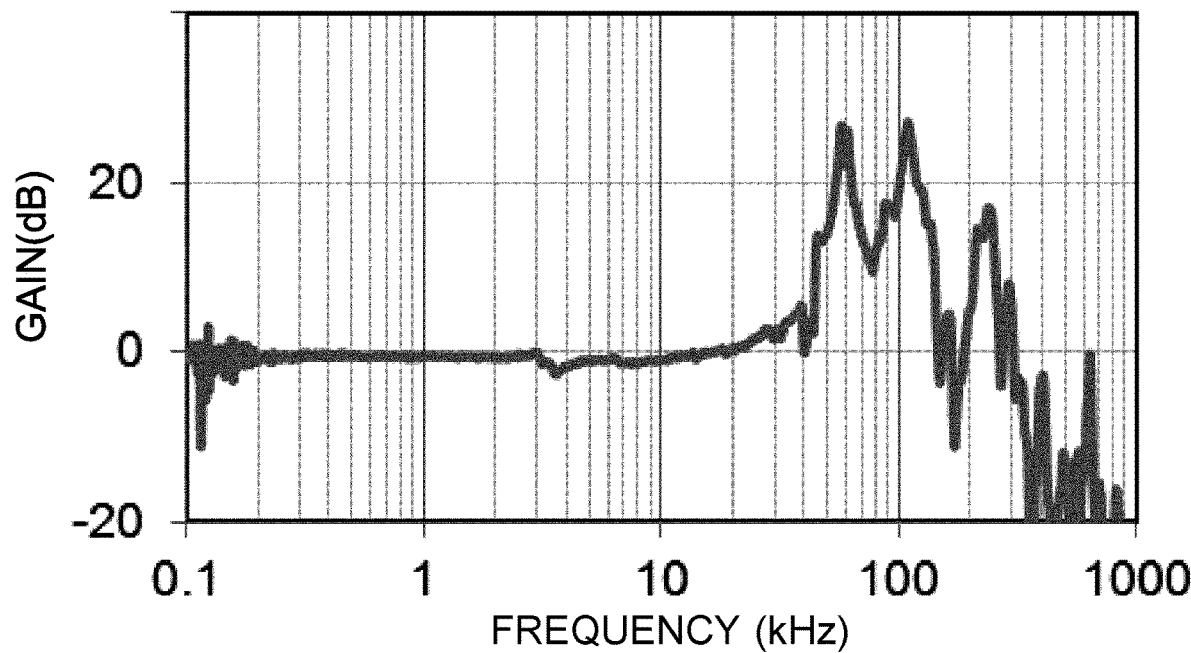
FIG. 8 is a diagram showing the frequency characteristic of X scanning by a narrow range XY scanner.

FIG. 8 shows the frequency characteristic of the X scanning by the narrow range XY scanner 230. The frequency characteristic of the X scanning by the narrow-range XY scanner 230 has the first resonance peak at about 60 kHz. With the first resonance peak at this frequency, an image of 100 pixels each in the vertical and horizontal directions for the maximum scanning range (700 nm in the X direction, 1.5 µm in the Y direction) by the narrow-range XY scanner 230 can be acquired at 33 milliseconds per frame. This means that the frame rate is about 30 fps, and the measurement result of the atomic force microscope 1 or the like can be obtained as a relatively smooth moving image.

Comparative Example 1

Figure 9:
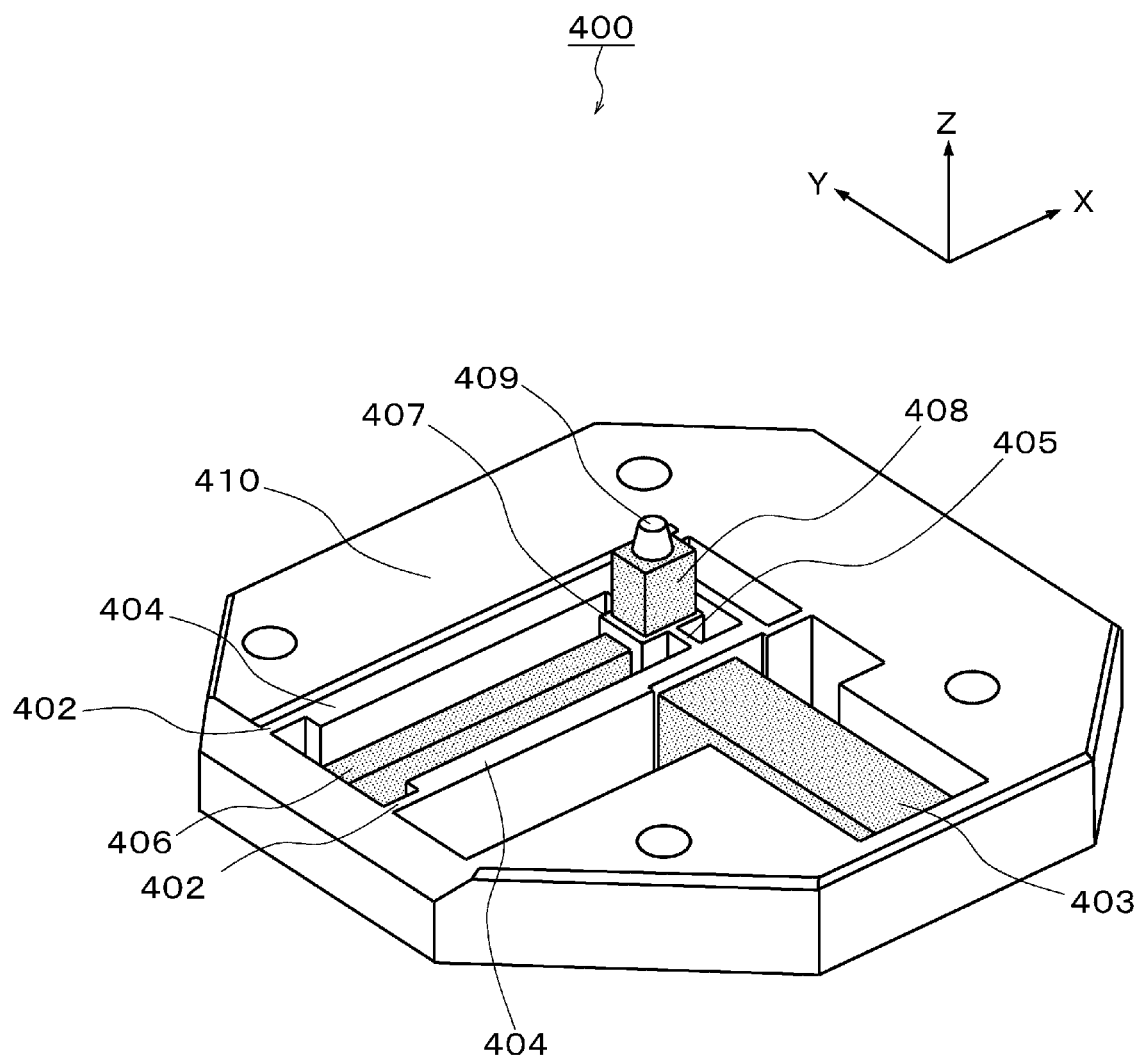
FIG. 9 is a diagram showing the structure of a scanner used as a comparative example.
Figure 10:
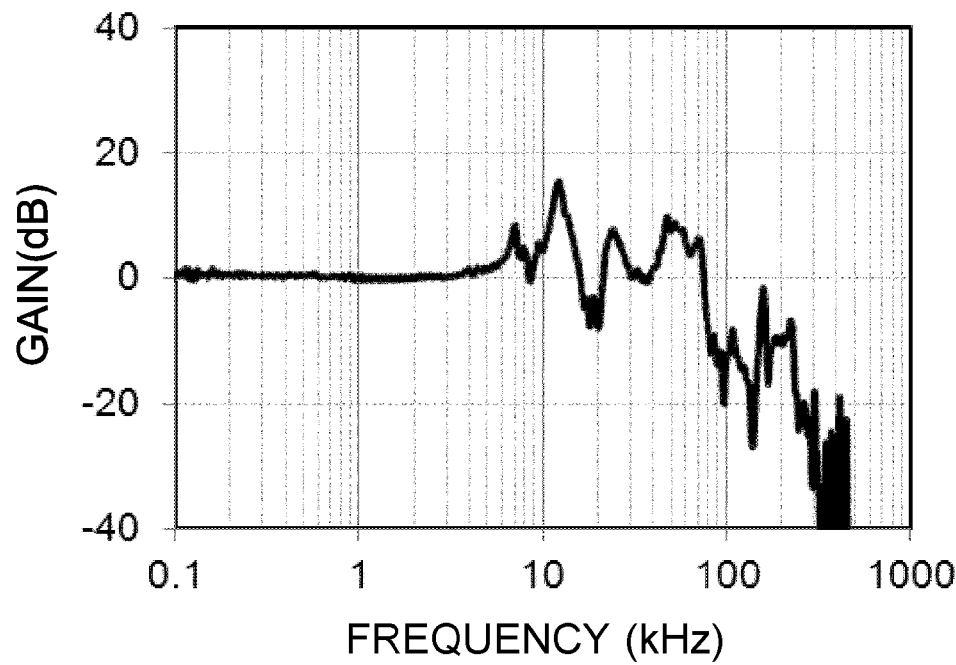
FIG. 10 is a diagram showing the frequency characteristic of X scanning by a conventional scanner.

The structure of the scanner 400 used as Comparative Example 1 is shown in FIG. 9. The scanner 400 has a structure in which an inner frame 404 is supported on the inner side of an outer frame 410 via a plate springs 402 that can be deflected in the Y direction, and a base portion 407 is supported on the inner side of the inner frame 404 via a plate springs 405 that can be deflected in the X direction. Between the inner side surface of the outer frame 410 and the outer side surface of the inner frame 404, a Y actuator 403 that expands and contracts in the Y direction in accordance with an applied voltage is provided. An X actuator 406 that expands and contracts in the X direction in accordance with an applied voltage is provided between the inner side surface of the outer frame 410 and the outer side surface of the base portion 407. A stage 409 is provided on the base portion 407 via a Z actuator 408 that expands and contracts in the Z direction in accordance with an applied voltage. The expansion coefficient of the X actuator 406 was 70 nm/V, that is, 7 µm in the maximum scanning range applied with 0 to 100 volts. The maximum scanning range in the Y direction was 6 µm. FIG. 10 shows the frequency characteristic of the X scan by the X actuator 406. The frequency characteristic of the X-scan by the conventional scanner 400 has the first resonance peak at about 7 kHz. With the first resonance peak at this frequency, an image of 100 pixels each in the vertical and horizontal directions for the maximum scanning range (7 µm in the X direction and 6 µm in the Y direction) by the scanner 400 can be acquired at 0.3 sec/frame.

As described above, as the frequency characteristics of Example 1 and Comparative Example 1 are shown, the wide range XY scanner 220 can realize the wide range scanning at the same speed as that of the conventional type scanner. On the other hand, in the narrow-range XY scanner 230, high-speed scanning can be realized to the extent that a smooth moving image can be acquired in the scanning range of the nanometer scale. As described above, the scanner 200 can perform both wide-range measurement and high-speed and high-precision measurement. As an application example, for example, when the scanner 200 is applied to a measurement system in a liquid as shown in FIG. 1, appearance imaging of cells and dynamic imaging of protein molecules in living cells can be performed seamlessly.

Example 2

The frequency at which the resonance peak appears in the frequency characteristic of the actuator affects the scanning speed not only in the XY direction but also in the Z direction. Therefore, in Example 2 described below, the scanner 500 having the structure shown in FIG. 6 was manufactured and applied to an atomic force microscope, and the frequency characteristics (gain vs. frequency) of the Z-direction scanning of the wide range Z actuator 501 and the narrow range Z actuator 504 were compared with the frequency characteristics of the Z direction scanning in the conventional scanner (Comparative Example 2).

In Example 2, a scanner 500 having the structure shown in FIG. 6 was used. The expansion coefficient of the wide range Z actuator was 25 nm/V (i.e., 2.5 µm for the maximum scanning range applied from 0 to 100 volts), and the expansion coefficient of the narrow range Z actuator 504 was 10 nm/V (i.e., 500 nm for the maximum scanning range applied from 0 to 50 volts).

Figure 11:
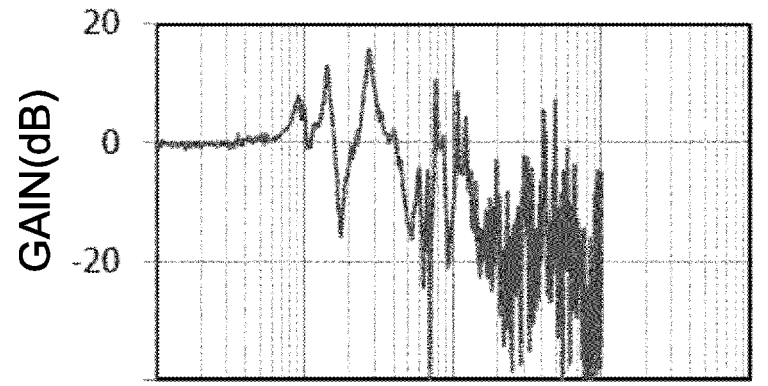
FIG. 11 (a) is a diagram showing the frequency characteristics of Z scanning by the wide range Z actuator.
Figure 11:
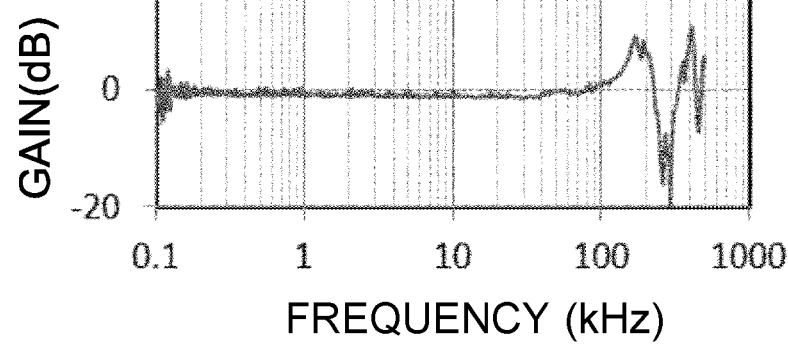

FIG. 11 (*a*) shows the frequency characteristic of the Z scanning by the wide range Z actuator 501. In the illustrated frequency characteristic, the horizontal axis represents the frequency (drive frequency) of the triangular wave for driving the wide range Z actuator 501, and the vertical axis represents the displacement (gain) at each drive frequency. The frequency characteristic of the Z scanning by the wide range Z actuator 501 has the first resonance peak at about 1 kHz. Although this resonance peak may limit the bandwidth of the feedback control, images of 100 pixels each in the vertical and horizontal directions can be acquired at about 10 seconds/frame, which is about the same as when observing a sample having a large structure in a conventional wide range scan.

FIG. 11 (b) shows the frequency characteristic of the Z scanning performed by the narrow range Z actuator 504. The frequency characteristic of the Z scanning by the narrow range Z actuator 504 has the first resonance peak at about 150 kHz. In the case of having the first resonance peak at this frequency, this resonance peak is not the rate limiting of the bandwidth of the feedback control, and images can be acquired at, for example, about 33 milliseconds/frame. This means that the frame rate is about 30 fps, and the measurement result of the atomic force microscope 1 or the like can be obtained as a relatively smooth moving image. In addition, since the narrow range Z actuator 504 has an expansion coefficient smaller than that of the wide range Z actuator 501, the resolution in the Z direction can be improved.

Comparative Example 2

Figure 12:
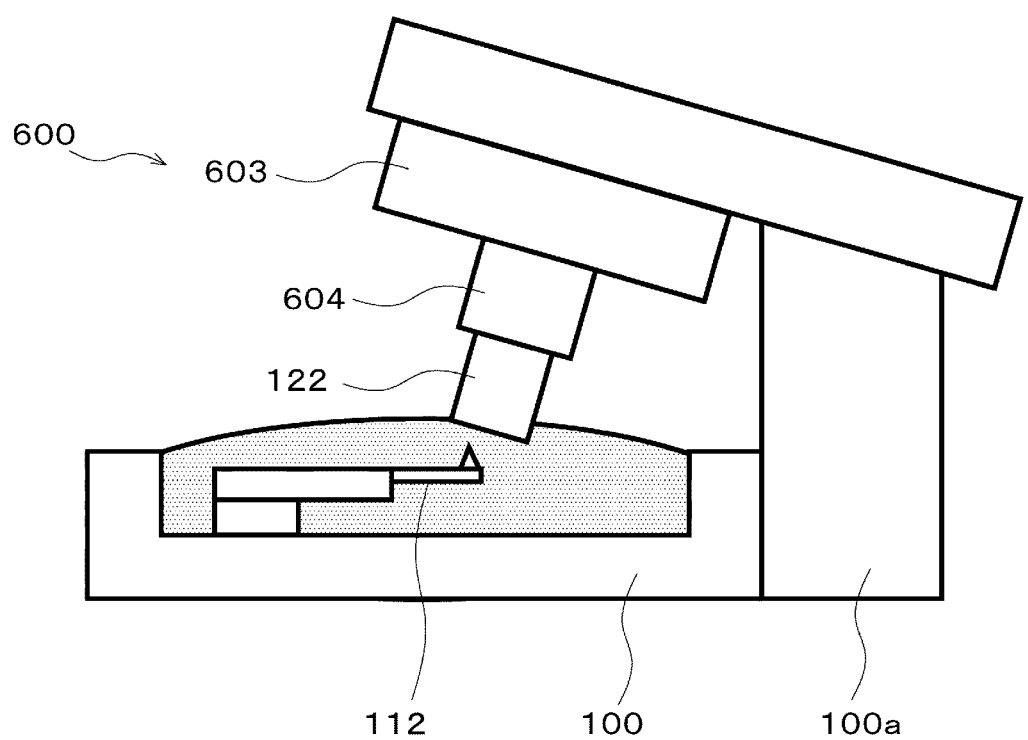
FIG. 12 is a schematic diagram showing a configuration of a probe microscope using a scanner provided with a conventional Z actuator.
Figure 13:
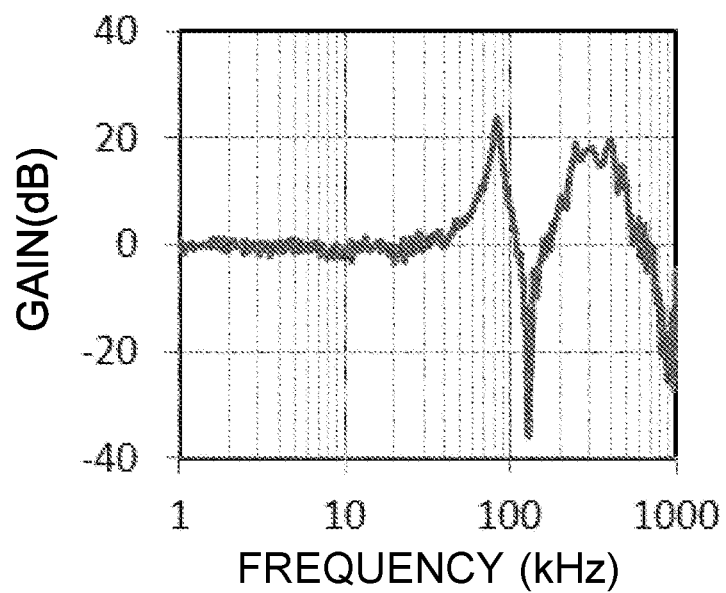
FIG. 13 is a diagram showing the frequency characteristics of Z scanning by a conventional Z actuator.

As Comparative Example 2, a conventional scanner 600 as shown in FIG. 12 was used. Scanner 600 does not have a wide range Z actuator and includes a single Z actuator 604 with a relatively large expansion coefficient. The Z actuator 604 is supported by the XY scanner 603. The expansion coefficient of the Z actuator 604 in the scanner 600 was 21 nm/V, i.e., 1.05 μm for the maximum scanning range applied from 0 to 50 volts. FIG. 13 shows the frequency characteristics of the Z scanning performed by the Z actuator 604 of Comparative Example 2. The frequency characteristic of the Z-scan by the conventional scanner 604 has the first resonance peak at about 80 kHz. In the case of having the first resonance peak at this frequency this resonance peak is not the rate limiting of the bandwidth of the feedback control, and an image can be acquired at a relatively high speed. However, since the expansion coefficient of the Z actuator is relatively large, the resolution in the Z direction is inferior to that of the narrow range Z actuator 504 in the second embodiment.

As described above, as shown in the frequency characteristics of Embodiment 2 and Comparative Example 2, scanning with a large area Z actuator can measure a sample with a large structure at a speed comparable to using a conventional actuator. In the scanning using the narrow range Z actuator, high-speed and high-resolution scanning can be realized to the extent that a smooth moving image can be acquired in the scanning range of the nanometer scale. As described above, according to the scanner including the wide range Z actuator and the narrow range Z actuator, the wide range measurement can be made compatible with the high-speed and high-precision measurements Modifications of the Embodiments Although the embodiments of the present invention have been described above, the present invention is not limited to these examples. For example, although the scanner is applied to an atomic force microscope, it can also be applied to a probe microscope other than an atomic force microscope, and it can also be applied to a microscope other than a probe microscope as long as the measurement principle is not affected.

In the first embodiment, the stage 122 is movable in the X direction, the Y direction, and the Z direction by the scanner 200. However, in the Z direction, not the stage but the probe may move.

In the first embodiment, the stage 122 is movable in the X direction, the Y direction, and the Z direction by the scanner 200, but the probe may be moved by the scanner 200.

In the first embodiment described above, the first inner frame 222 is a U-shaped frame body, and the wide range Y actuator 224 is configured to contact the inner side surface of the outer frame 210 through the missing portion of the first inner frame 222; however, the first inner frame 222 may be configured to be a rectangular frame body, and the wide range Y actuator 224 may be configured to contact the inner side surface of the first inner frame 222 instead of the outer frame 210.

In the first embodiment, the movable base counterpart 237 having the same weight as the movable base 236 is disposed inside the third inner frame 232, and the narrow range X actuator 238 is disposed between the movable base 236 and the movable base counterpart 237; however, the narrow range X actuator 238 may be disposed between the second inner frame 226 and the third inner frame 232 without providing the movable base counterpart 237.

Figure 14:
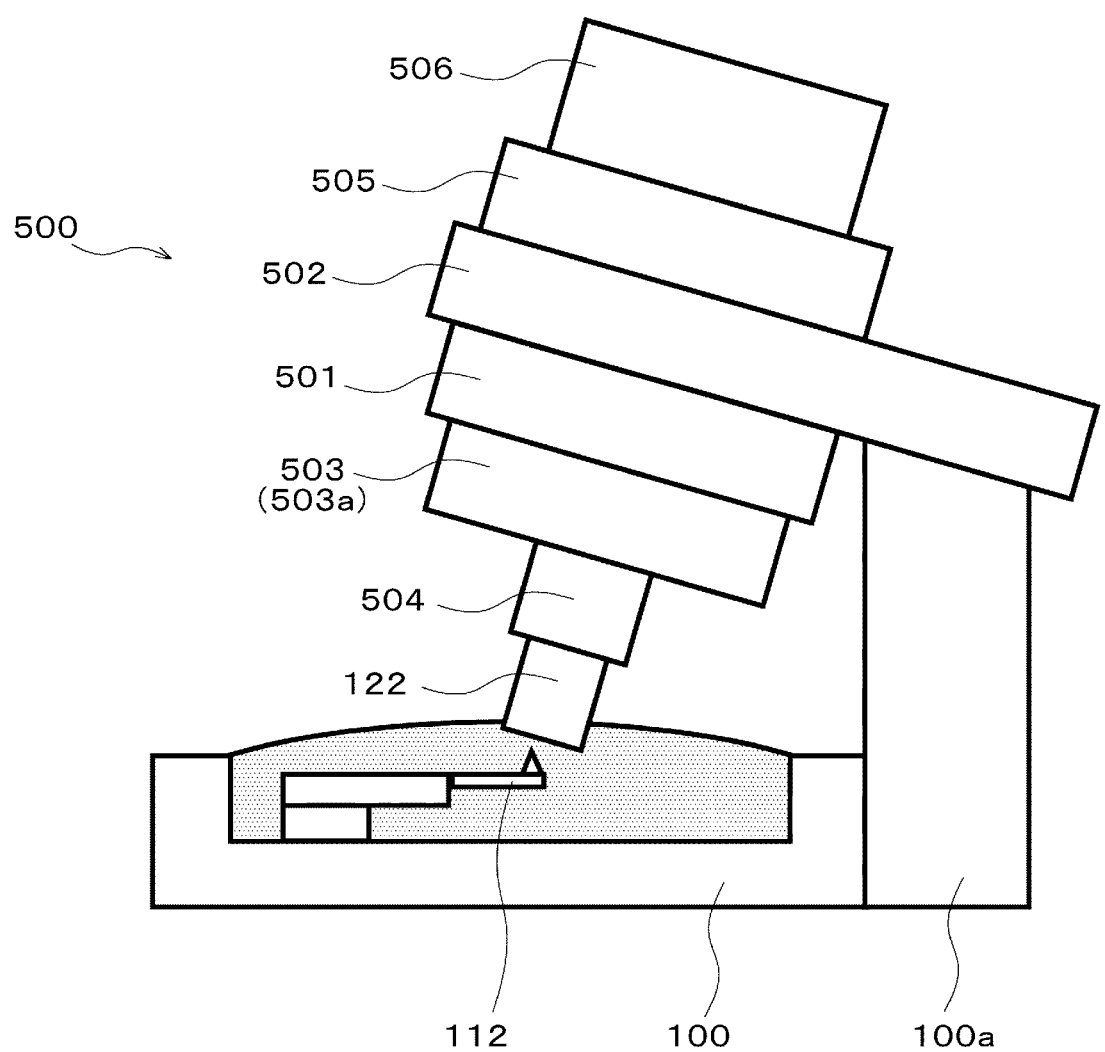
FIG. 14 is a schematic diagram showing a configuration of a probe microscope using a scanner according to a modification of the second embodiment.

Also in the second embodiment, a counter balance for maintaining the balance in the Z direction may be provided. For example, as shown in FIG. 14, the wide range Z actuator 501 may be fixed to one surface of the support plate 502, and the XY scanner 503 may be directly supported. A counter wide range Z actuator 505 having the same characteristics as the wide range Z actuator 501 may be provided on the other surface of the support plate 502. The counter wide range Z actuator 501 may support the XY scanner 503, the movable base 503a, the narrow range Z actuator 504, and a counter balance 506 equal in weight to the total weight of the stage 122 (and the sample) on the opposite side of the support plate 502. The support plate 502 is attached to the support post 100a of the microscope chassis 100. In this manner, the balance in the Z direction in the case where the wide range Z actuator 501 is used is maintained, and the band reduction of the XY scanner 503 due to the imbalance can be suppressed.

As described above, according to the scanner according to each embodiment of the present invention, the high-speed, high-resolution narrow range scanning and the wide-range coarse motion scanning can be made compatible with each other.

Figure 15:
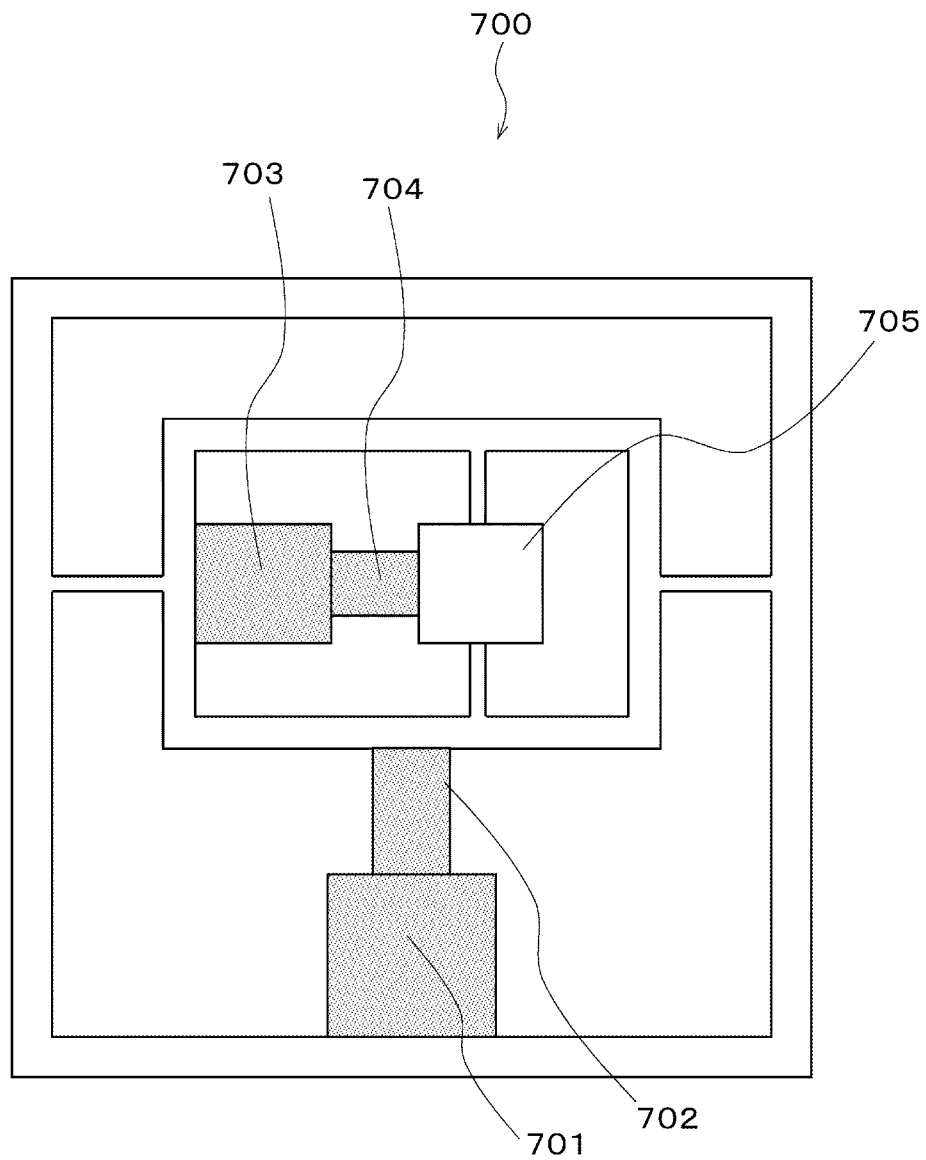
FIG. 15 is a plan view showing an example of a scanner having a mechanical series configuration.
Figure 16:
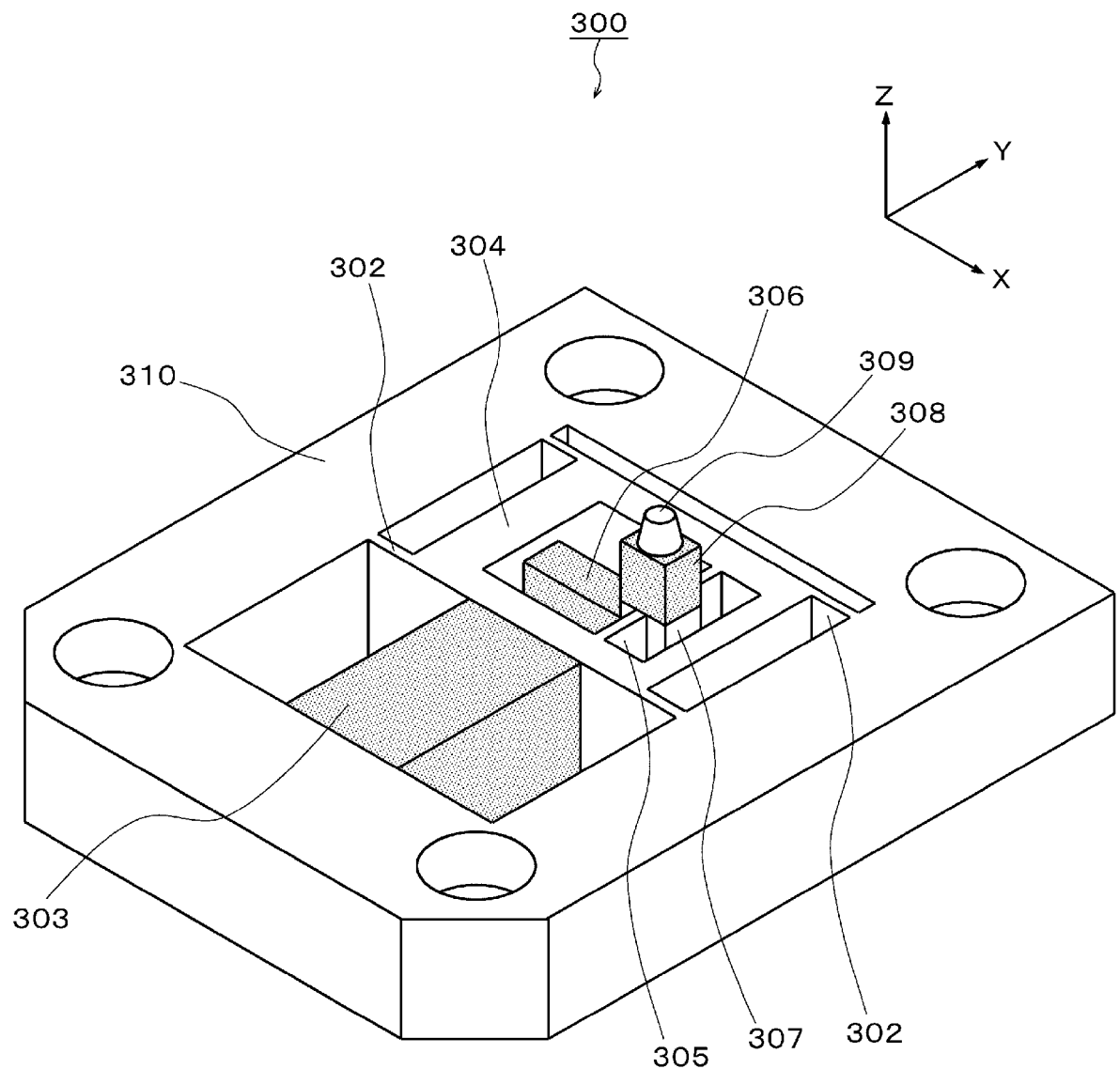
FIG. 16 is a diagram showing an example of the structure of a scanner conventionally used.

For example, as illustrated in FIG. 15, it is possible to achieve both wide range scanning and narrow range scanning by a scanner 700 having a mechanical series configuration in which a wide range actuator (701, 703) and a narrow range actuator (702, 704) are superposed for each of X and Y. However, in such a mechanical series configuration, it is necessary to drive the wide and narrow actuators for one of the X or Y direction scans (in the configuration of FIG. 15, the Y direction scans) with the stage 705 for the other scan. For this reason, the driving bands of the narrow scanning and the wide scanning are necessarily lowered in one scanning direction, and high-speed scanning cannot be realized. For this reason, it is difficult to realize high-speed imaging of atomic and molecular levels in a scanner having a mechanical series configuration.

In addition, it is possible to achieve both wide range scanning and narrow range scanning by a configuration in which a cylindrical scanner as disclosed in Japanese Patent Application Laid-Open No. 2001-305036 is used in a superimposed manner. However, the cylindrical scanner has a disadvantage in that scanning in the X direction and scanning in the Y direction tends to interfere with each other. For this reason, it is difficult to realize high-speed imaging at the atomic and molecular levels in a configuration in which cylindrical scanners are superposed.

In contrast to the other scanner configurations capable of compatibility between the narrow range fine movement scanning and the wide range coarse movement scanning, the scanner according to the present invention employing the nested structure using the inner frame and the outer frame can speed up the fine movement scanning in both the X direction and the Y direction, thereby realizing the high-speed and high-resolution narrow-range scanning. Further, if the configuration of the narrow range scanning is miniaturized, the speed of the wide range scanning can be increased. In addition, scanning in the X direction and the Y direction is hardly interfered owing to the nested structure using the inner frame and the outer frame. For this reason, according to the scanner of the present invention, it is possible to perform high-speed imaging at the atomic and molecular levels, and it is possible to capture the kinetics of the atoms and molecules.

In addition, as long as the gist of the present invention is provided, a person skilled in the art may appropriately add, delete, or change the design of the constituent elements or appropriately combine the features of each embodiment with respect to each of the above-described embodiments, the present invention is included in the scope of the present invention.

REFERENCE SIGNS LIST

1 Atomic force microscope
100 Microscope chassis
102 Controller
104 Computer
106 Monitor
110 Cantilever chip
112 Cantilever
114 Probe
115 Excitation Piezoelectric body
116 Optical sensor unit
120 Scanner stage unit
122 Stage
200 Scanner
220 Wide range XY scanner
222 First inner frame
223 Plate spring
224 Wide range Y actuator
226 Second inner frame
227 Plate spring
228 Wide range X actuator
230 Narrow range XY scanner
232 Third inner frame
233 Plate spring
234 Narrow Y actuator
236 Movable base
237 Movable base counterpart
238 Narrow X actuator
239 Plate spring
240 Z actuator
242 Counter balance

The invention claimed is:
1. A scanner comprising:
an outer frame;
a first inner frame disposed inside the outer frame;
a wide range Y actuator for moving the first inner frame relative to the outer frame in the Y direction;
a second inner frame disposed inside the first inner frame;
a wide range X actuator for moving the second inner frame relative to the first inner frame in an X direction orthogonal to the Y direction;
a third inner frame disposed inside the second inner frame;
a narrow range Y actuator for moving the third inner frame relative to the second inner frame in the Y direction;
a movable base disposed inside the third inner frame; and
a narrow range X actuator for moving the movable base relatively to the third inner frame in the X direction,
wherein:
the wide range Y actuator is a piezoelectric element expandable and contractible in the Y direction in response to a control signal, and is disposed between an inner side surface of the outer frame and an outer side surface of the first inner frame;
the wide range X actuator is a piezoelectric element expandable and contractible in the X direction in response to a control signal, and is disposed so that one end of the wide range X actuator abuts on the approximate center in the Y direction on the inner side surface of the outer frame or on the approximate center in the Y direction on an inner side surface of the first inner frame, and the other end abuts the approximate center in the Y direction on an outer side surface of the second inner frame; and
the narrow range Y actuator is a piezoelectric element expandable and contractible in the Y direction in response to a control signal, and is disposed so that one end of the narrow range Y actuator abuts on the approximate center in X direction on an inner side surface of the second inner frame, and the other end abuts the approximate center in the X direction on an outer side surface of the third inner frame.

2. The scanner according to claim 1, further comprising a stage supported by the movable base.

3. The scanner according to claim 2, wherein:
the range in which the stage can be moved by the wide range X actuator is wider than the range in which the stage can be moved by the narrow range X actuator; and
the range in which the stage can be moved by the wide range Y actuator is wider than the range in which the stage can be moved by the narrow range Y actuator.

4. The scanner according to claim 2, wherein the stage is supported on the movable base via a Z actuator that relatively moves the stage in the Z direction orthogonal to the X direction and the Y direction.

5. The scanner according to claim 4, wherein a counter balance having a weight substantially equal to the total weight of the Z actuator and the stage is mounted on a surface of the movable base opposite to a surface on which the stage is supported via the Z actuator.

6. The scanner according to claim 1, wherein:
the first inner frame is connected to the outer frame via a plurality of plate springs whose plate surfaces are substantially orthogonal to the Y direction;
the second inner frame is connected to the first inner frame via a plurality of plate springs whose plate surfaces are substantially orthogonal to the X direction;
the third inner frame is connected to the second inner frame via a plurality of plate springs whose plate surfaces are substantially orthogonal to the Y direction; and the movable base is connected to the third inner frame via a plurality of plate springs whose plate surfaces are substantially orthogonal to the X direction.

7. The scanner according to claim 1, further comprises a movable base counterpart having a weight substantially equal to that of the movable base disposed inside third inner frame,
wherein:
the movable base and the movable base counterpart are each connected to the third inner frame via a plurality of plate springs whose plate surfaces are substantially orthogonal to the X direction; and
the narrow range X actuator is a piezoelectric element expandable and contractible in the X direction in response to a control signal, and is disposed between the movable base and the movable base counterpart, and the narrow range X actuator does not contact with the third inner frame.

8. The scanner according to claim 7, wherein:
the third inner frame is a substantially rectangular frame body comprising side wall portions formed of two flat plates parallel to the X-Z plane, and connection portions formed of two flat plates parallel to the Y-Z plane and connecting the two side wall portions; and
the plate spring is provided to connect the inner side surfaces of the two side walls in parallel with the Y-Z plane.

9. The scanner according to claim 1, wherein the probe is supported by the movable base.

10. The scanner according to claim 4, further comprises a wide range Z actuator for moving the outer frame relative to a support base in the Z direction,
wherein the movable range by the wide range Z actuator is wider than the movable range by the Z actuator.

11. A scanning probe microscope comprising the scanner of claim 1.

* * * * *